United States Patent
Wang et al.

(10) Patent No.: US 11,877,601 B2
(45) Date of Patent: Jan. 23, 2024

(54) ATOMIZER IDENTIFIER OF ELECTRONIC ATOMIZATION DEVICE AND RELATED DEVICE

(71) Applicant: Shenzhen Smoore Technology Limited, Shenzhen (CN)

(72) Inventors: Shengli Wang, Shenzhen (CN); Rongbin Mo, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 622 days.

(21) Appl. No.: 17/118,621

(22) Filed: Dec. 11, 2020

(65) Prior Publication Data
US 2021/0186112 A1 Jun. 24, 2021

(30) Foreign Application Priority Data
Dec. 24, 2019 (CN) .......................... 201911348608.2

(51) Int. Cl.
*A24F 40/53* (2020.01)
*H02J 7/00* (2006.01)

(52) U.S. Cl.
CPC ............. *A24F 40/53* (2020.01); *H02J 7/0063* (2013.01)

(58) Field of Classification Search
None
See application file for complete search history.

(56) References Cited

U.S. PATENT DOCUMENTS

| 2015/0075545 A1* | 3/2015 | Xiang | A24F 40/53 429/61 |
| 2016/0226286 A1 | 8/2016 | Xiang | |
| 2017/0135405 A1* | 5/2017 | Reevell | H01C 7/06 |

(Continued)

FOREIGN PATENT DOCUMENTS

| CN | 203633514 U | 6/2014 |
| CN | 104432534 A | 3/2015 |

(Continued)

OTHER PUBLICATIONS

Chinese First Office Action,Application No. 201911348608.2,dated Aug. 8, 2022(6 pages).

(Continued)

*Primary Examiner* — James Harvey (57) ABSTRACT

The atomizer identifier is configured to identify an atomizer connected to a battery pole. The atomizer includes a first contact structure and an atomizer identification circuit, and the battery pole further includes a second contact structure matching the first contact structure. The atomizer identifier includes: an identifier chip, configured to determine whether to provide an identification voltage; and a peripheral circuit, configured to connect the identifier chip and the second contact structure, for being connected to the atomizer identification circuit via the second contact structure and the first contact structure of the atomizer connected to the battery pole in a first connection manner or the atomizer connected to the battery pole in a second connection manner, so that the atomizer identification circuit is driven according to the identification voltage determined to be provided by the identifier chip to read information of the atomizer identification circuit to the identifier chip.

20 Claims, 5 Drawing Sheets

(56) References Cited

U.S. PATENT DOCUMENTS

| | | | |
|---|---|---|---|
| 2021/0186112 A1* | 6/2021 | Wang | A24F 40/53 |
| 2021/0186115 A1* | 6/2021 | Wang | A24F 40/60 |
| 2023/0248069 A1* | 8/2023 | Zhao | A24F 40/40 |
| | | | 131/329 |

FOREIGN PATENT DOCUMENTS

| | | | |
|---|---|---|---|
| CN | 105578908 A | 5/2016 | |
| CN | 108135262 A | 6/2018 | |
| CN | 109843093 A | 6/2019 | |
| CN | 110169598 A | 8/2019 | |
| CN | 209251753 U | 8/2019 | |
| CN | 110226778 A | 9/2019 | |
| CN | 110367594 A | 10/2019 | |
| CN | 209563493 U | 11/2019 | |
| EP | 2399636 A1 | 12/2011 | |
| WO | WO2019048211 A1 | 3/2019 | |

OTHER PUBLICATIONS

European Search Report, Application No. 20217074.2, dated May 25, 2021 (8 pages).

* cited by examiner

ATOMIZER IDENTIFIER OF ELECTRONIC ATOMIZATION DEVICE AND RELATED DEVICE

CROSS-REFERENCE TO RELATED APPLICATIONS

The present application is a continuation-application of the Chinese Patent Application No. 201911348608.2, filed on Dec. 24, 2019, in the National Intellectual Property Administration of China, the entire contents of which are hereby incorporated by reference in their entireties.

TECHNICAL FIELD

The present disclosure relates to the field of electronic atomization devices, and in particular to an atomizer identifier applied to an electronic atomization device and a related device.

BACKGROUND

In order to identify atomizers by different flavors, atomizers in the related art are provided with identifiers which may include resistors indicating flavor information of the atomizers, that is, different resistance values correspond to the different flavors.

In the related art, while using the atomizer and a battery pole, the atomizer cannot be reversely inserted into the battery pole. Moreover, in order to prevent reverse insertion, the battery pole is generally provided with an anti-reverse-insertion interface.

SUMMARY OF THE INVENTION

In order to solve the above technical problem, a first technical solution adopted by the present disclosure is to provide an atomizer identifier, applied to an electronic atomization device for identifying an atomizer connected to a battery pole. The atomizer includes a first contact structure and an atomizer identification circuit. The battery pole includes a second contact structure matching the first contact structure. The atomizer identifier includes an identifier chip and a peripheral circuit. The identifier chip is configured to determine whether an identification voltage is to be provided. The peripheral circuit is configured to connect the identifier chip and the second contact structure. The peripheral circuit is connected to the atomizer identification circuit via the second contact structure and the first contact structure of the atomizer, the atomizer is connected to the battery pole in a first connection manner or in a second connection manner. The atomizer identification circuit is driven based on the identification voltage determined to be provided by the identifier chip to read and input information of the atomizer identification circuit to the identifier chip.

In order to solve the above technical problem, a second technical solution adopted by the present disclosure is to provide a battery pole of an electronic atomization device, and the battery pole includes an atomizer identifier, and the atomizer identifier is configured to identify an atomizer connected to the battery pole. The atomizer includes a first contact structure and an atomizer identification circuit, and the battery pole further includes a second contact structure matching the first contact structure. The atomizer identifier includes: an identifier chip and a peripheral circuit. The identifier chip is configured to determine whether an identification voltage is to be provided. The peripheral circuit is configured to connect the identifier chip and the second contact structure. The peripheral circuit is connected to the atomizer identification circuit via the second contact structure and the first contact structure of the atomizer, the atomizer is connected to the battery pole in a first connection manner or in a second connection manner. The atomizer identification circuit is driven based on the identification voltage determined to be provided by the identifier chip to read and input information of the atomizer identification circuit to the identifier chip In order to solve the above technical problem, a third technical solution adopted by the present disclosure is to provide an electronic atomization device, including an atomizer and a battery pole. The atomizer includes a first contact structure and an atomizer identification circuit. The battery pole includes an atomizer identifier and a second contact structure matching the first contact structure, and the atomizer is arranged inside the battery pole and connected to the battery pole. The atomizer identifier includes an atomizer identifier, and the atomizer identifier is configured to identify an atomizer connected to the battery pole. The atomizer includes a first contact structure and an atomizer identification circuit, and the battery pole further includes a second contact structure matching the first contact structure. The atomizer identifier includes an identifier chip and a peripheral circuit. The identifier chip is configured to determine whether an identification voltage is to be provided. The peripheral circuit is configured to connect the identifier chip and the second contact structure. The peripheral circuit is connected to the atomizer identification circuit via the second contact structure and the first contact structure of the atomizer, the atomizer is connected to the battery pole in a first connection manner or in a second connection manner. The atomizer identification circuit is driven based on the identification voltage determined to be provided by the identifier chip to read and input information of the atomizer identification circuit to the identifier chip.

DETAILED DESCRIPTION

Technical solutions in the embodiments of the present disclosure will be clearly and completely described below in conjunction with the drawings in the embodiments of the present application. Obviously, the embodiments described are merely a part of the embodiments of the present disclosure, rather than all the embodiments. All other embodiments attained by persons of ordinary skill in the art based on the embodiments of the present disclosure without expending inventive labor shall fall within the protection scope of the present disclosure.

The present invention will be described in detail below in conjunction with the drawings and embodiments.

Figure 1:
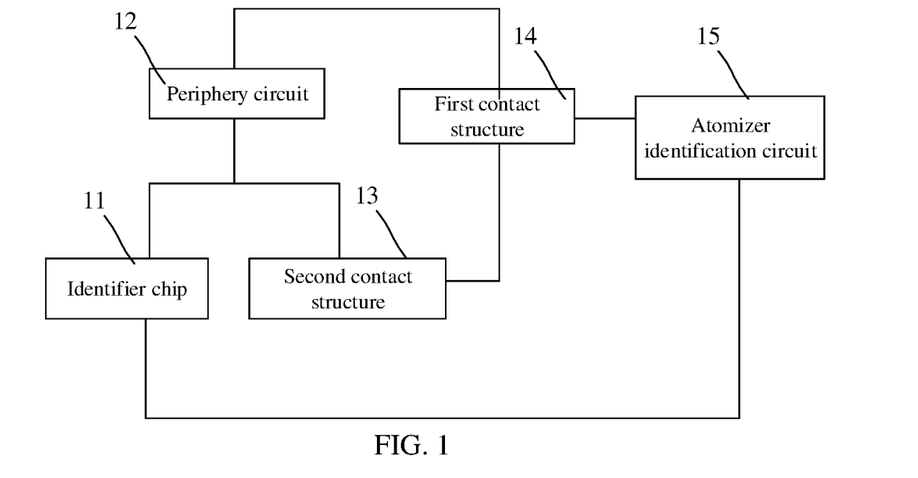
FIG. 1 is a schematic structural diagram of a first embodiment of an atomizer identifier applied to an electronic atomization device according to the present disclosure.
Figure 2A:
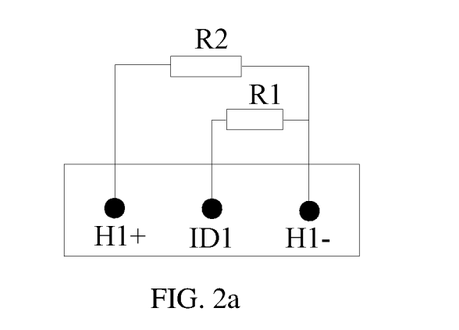
FIG. 2a is a schematic structural diagram of a first embodiment of an atomizer according to the present disclosure.

FIG. 1 is a schematic structural diagram of a first embodiment of an atomizer identifier applied to an electronic atomization device according to the present disclosure. The atomizer identifier is configured to identify an atomizer connected to a battery pole. The atomizer includes a first contact structure 14 and an atomizer identification circuit 15. In details, referring to FIG. 2a, the first contact structure 14 includes a first electrode contact H1+, a first identification contact ID1, and a second electrode contact H1−. In order to easily achieve connection of the atomizer to the battery pole in a first connection manner or a second connection manner, the first electrode contact H1+ and the second electrode contact H1− are symmetrically arranged on two sides of the first identification contact ID1. Referring to FIG. 2a, the atomizer identification circuit 15 is an identification resistor R1. In details, the identification resistor R1 is connected between the first identification contact ID1 and the second electrode contact H1−. Further, referring to FIG. 2a, the atomizer further includes a heating element R2, which is a heating wire. The heating element R2 is connected between the first electrode contact H1+ and the second electrode contact H1−. An end of the identification resistor R1 not connected to the first identification contact ID1 and an end of the heating element R2 not connected to the first electrode contact H1+ are connected to the second electrode contact H1−.

Figure 2B:
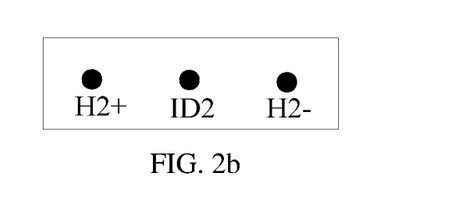
FIG. 2b is a schematic structural diagram of a first embodiment of a battery pole according to the present disclosure.

Referring to FIG. 2b, the battery pole includes a second contact structure 13 matching the first contact structure 14. The second contact structure 13 includes a positive electrode contact H2+, a second identification contact ID2, and a negative electrode contact H2−. In order to easily achieve the connection of the atomizer to the battery pole in the first connection manner or in the second connection manner, the positive electrode contact H2+ and the negative electrode contact H2− are respectively symmetrically arranged on two sides of the second identification contact ID2.

In an embodiment, the atomizer may be inserted into the battery pole to operate. In this way, the atomizer being connected to the battery pole in the first connection manner may be interpreted as the atomizer being positively inserted into the battery pole; and the atomizer being connected to the battery pole in the second connection manner may be interpreted as the atomizer being reversely inserted into the battery pole. In another embodiment, the atomizer may be screwed into the battery pole to operate. In this way, after the atomizer is connected to the battery pole, switching between the connection in the first connection manner and the connection in the second connection manner is achievable by rotating the atomizer at a certain angle. In details, the solution of the present invention is explained with an example where the atomizer is positively inserted into the battery pole in the first connection manner and is reversely inserted into the battery pole in the second connection manner.

Figure 2C:
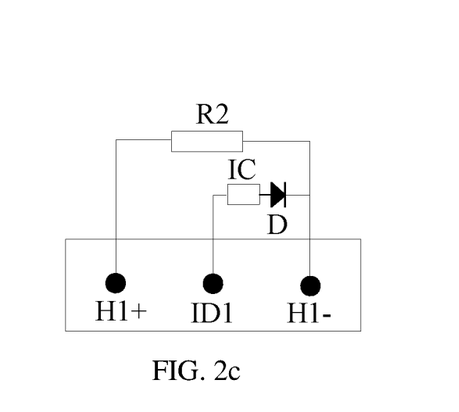
FIG. 2c is a schematic structural diagram of a second embodiment of an atomizer according to the present disclosure.

In other embodiments, FIG. 2c shows another structure of the atomizer. In detail, the structure shown in FIG. 2c is different from the structure of the atomizer shown in FIG. 2a. In the present embodiment, the atomizer identification circuit 15 is an identification chip IC. Specifically, the identification chip IC is connected between the first identification contact ID1 and the second electrode contact H1−. The connection manner of the heating element R2 is identical to that in the embodiment shown in FIG. 2a, and details are omitted herein. In addition, the present embodiment further includes a diode D connected in series with the identification chip IC. In details, a cathode of the diode D is connected to the second electrode contact H1−, and an anode of the diode D is connected to the identification chip IC.

In the present application, when either the atomizer shown in FIG. 2a or the atomizer shown in FIG. 2c is connected to the battery pole shown in FIG. 2b in the first connection manner, the first electrode contact H1+ of the first contact structure 14 in the atomizer is in contact with the positive electrode contact H2+ of the second contact structure 13 in the battery pole, the first identification contact ID1 of the first contact structure 14 in the atomizer is in contact with the second identification contact ID2 of the second contact structure 13 in the battery pole, and the second electrode contact H1 of the first contact structure 14 in the atomizer is in contact with the negative electrode contact H2− of the second contact structure 13 in the battery pole.

When either the atomizer shown in FIG. 2a or the atomizer shown in FIG. 2c is connected to the battery pole shown in FIG. 2b in the second connection manner, the first electrode contact H1+ of the first contact structure 14 in the atomizer is in contact with the negative electrode contact H2− of the second contact structure 13 in the battery pole, the first identification contact ID1 of the first contact structure 14 in the atomizer is in contact with the second identification contact ID2 of the second contact structure 13 in the battery pole, and the second electrode contact H1− of the first contact structure 14 in the atomizer is in contact with the positive electrode contact H2+ of the second contact structure 13 in the battery pole.

In detail, the atomizer identifier shown in the present embodiment further includes an identifier chip 11 and a peripheral circuit 12. The identifier chip 11 is configured to determine whether an identification voltage is to be provided. The peripheral circuit 12 is connected to the identifier chip 11 and the second contact structure 13, for being connected to the atomizer identification circuit 15 via the second contact structure 13 and the first contact structure 14 of the atomizer connected to the battery pole. In this way, the atomizer identifier drives the atomizer identification circuit 15 to read and input information of the atomizer identification circuit 15 to the identifier chip 11 based on the identification voltage provided by the identifier chip 11, thereby obtaining information of the atomizer. In detail, the information of the atomizer identification circuit 15 acquired by the identifier chip 11 is a resistance value of the identification resistor R1, which identifies a flavor of the atomizer.

In detail, in an embodiment, when the atomizer is connected to the battery pole in the first connection manner, the atomizer identifier connects to the first identification contact ID1 and the second electrode contact H1− of the first contact structure 14 via the second identification contact ID2 and the negative electrode contact H2− of the second contact structure 13, thereby to further connect to the atomizer identification circuit 15 to form an electric pathway. Alternatively, in an embodiment, when the atomizer is connected to the battery pole in the second connection manner, the atomizer identifier connects to the first identification contact ID1 and the first electrode contact H1+ of the first contact structure 14 via the second identification contact ID2 and the negative electrode contact H2− of the second contact structure 13, thereby to further connect to the atomizer identification circuit 15 to form the electric pathway. When the atomizer is connected to the battery pole in either the first connection manner or the second connection manner, it is possible to drive the atomizer identification circuit 15 based on the identification voltage provided by the identifier chip 11, so as to read and input the information of the atomizer identification circuit 15 to the identifier chip 11, thereby obtaining the information of the atomizer.

The atomizer identifier applied to the electronic atomization device according to the present disclosure may identify the information of the atomizer identification circuit 15 through the identifier chip 11 when the atomizer is connected to the battery pole in the first connection manner or the second connection manner, thereby identifying the information of the atomizer. In the embodiment shown in the present disclosure, a situation of the identifier chip 11 being burnt may not occur when the atomizer is connected to the battery pole in either the first connection manner or the second connection manner.

Figure 3:
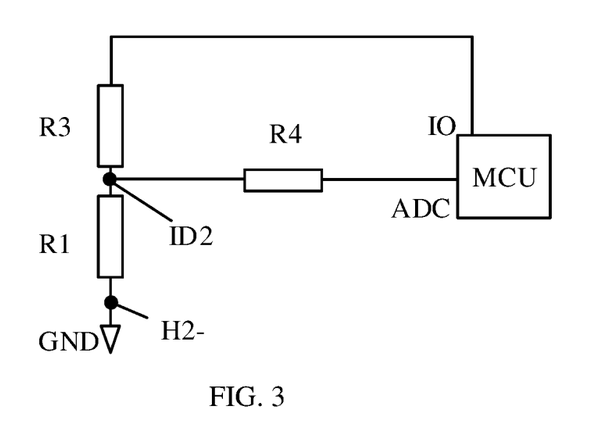
FIG. 3 is a schematic structural diagram of a second embodiment of an atomizer identifier applied to an electronic atomization device according to the present disclosure.

FIG. 3 is a schematic structural diagram of a second embodiment of an atomizer identifier applied to a battery pole of an electronic atomization device according to the present disclosure.

The atomizer identifier shown in the present embodiment is formed by connecting the atomizer shown in FIG. 2a to the battery pole shown in FIG. 2b in the first connection manner. In details, in the present embodiment, the atomizer identification circuit 15 is an identification resistor R1. An identifier chip MCU includes an identification voltage output port IO and an information acquisition port ADC. The identification voltage output port IO is configured to output the identification voltage to drive the atomizer identification resistor R1. The information acquisition port ADC is connected to the second identification contact ID2 for acquiring information of the identification resistor R1. In the present embodiment, the information of the identification resistor R1 includes information of the atomizer, and that is identifying different flavors of the atomizer.

In the present embodiment, the peripheral circuit 12 specifically includes a primary resistor R3. The identification voltage output port IO is connected to the second identification contact ID2 via the primary resistor R3, and the information acquisition port ADC is connected to the second identification contact ID2. In another embodiment, the peripheral circuit 12 further includes a current-limiting resistor R4. An end of the current-limiting resistor R4 is connected to the second identification contact ID2, and the other end of the current-limiting resistor R4 is connected to the information acquisition port ADC.

In detail, in the present embodiment, an end of the identification resistor R1 is connected to the second identification contact ID2, and the other end of the identification resistor R1 is connected to the negative electrode contact H2− and to a ground voltage GND. It may be understood that, since the atomizer identifier shown in the present embodiment is the atomizer being connected to the battery pole in the first connection manner, and that is, the second identification contact ID2 contacts the first identification contact ID1, the negative electrode contact H2− is connected to the second electrode contact H1− and to the ground voltage GND.

The atomizer identifier shown in the present embodiment is an identifier where the atomizer is connected to the battery pole in the first connection manner. When the atomizer is detected, the negative electrode contact H2− is connected to the second electrode contact H1− and to the ground voltage GND. The identification voltage output port IO of the identifier chip MCU outputs a high identification voltage. Meanwhile, the information acquisition port ADC of the identifier chip MCU acquires a partial pressure value of the identification resistor R1 for the high identification voltage and a partial pressure value of the primary resistor R3 for the high identification voltage, and the information acquisition port ADC of the identifier chip MCU acquires information of the identification resistor R1 and the primary resistor R3, and analyzes the acquired information, thereby obtaining the flavor of the atomizer.

Figure 4:
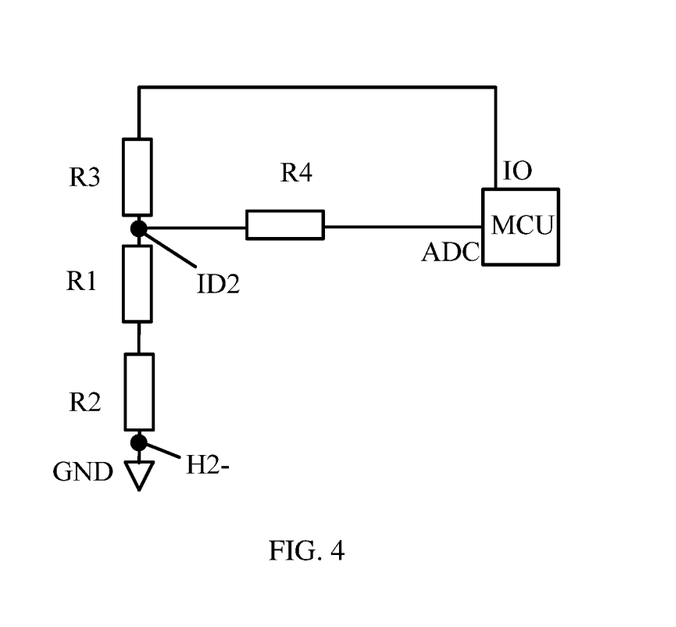
FIG. 4 is a schematic structural diagram of a third embodiment of an atomizer identifier applied to an electronic atomization device according to the present disclosure.

FIG. 4 is a schematic structural diagram of a third embodiment of an atomizer identifier applied to an electronic atomization device according to the present disclosure.

The atomizer identifier shown in the present embodiment is formed by connecting the atomizer shown in FIG. 2a to the battery pole shown in FIG. 2b in the second connection manner. In details, the embodiment shown in FIG. 4 is different from the embodiment shown in FIG. 3. In details, the atomizer identifier shown in the present embodiment further includes a heating element R2. An end of the heating element R2 is connected to the identification resistor R1 and the other end of the heating element R2 is connected to the negative electrode contact H2− and to the ground voltage GND.

In detail, since the atomizer shown in the present embodiment is connected to the battery pole in the second connection manner, the negative electrode contact H2− in the atomizer identifier is in contact with the first electrode contact H1+, the second identification contact ID2 is in contact with the first identification contact ID1, and the positive electrode contact H2+ is in contact with the second electrode contact H1−.

During operation, the negative electrode contact H2− is in contact and electrically connected to the first electrode contact H1+; and the identification resistor R1 and the heating element R2 are connected in series. In this situation, the identification resistor R1 and the heating element R2 work cooperatively with the primary resistor R3 to perform voltage partitioning on the identification voltage provided by the identification voltage output port IO of the identifier chip MCU. Since a resistance value of the identification resistor R1 is relatively great, whereas a resistance value of the heating element R2 is relatively small, the resistance value of the heating element R2 may be ignored in this case. The information acquisition port ADC of the identifier chip MCU may obtain the information of the atomizer by acquiring partial pressure values of the identification resistor R1 and the primary resistor R3, thereby obtaining the flavor of the atomizer.

In an embodiment, the resistance value of the identification resistor R1 is on a kiloohm level, for example, approximately 1 kiloohm, and the resistance value of the heating element R2 is on an ohm level, for example, approximately 1 ohm. It may be understood that, since the resistance value of the heating element R2 is significantly smaller than the resistance value of the identification resistor R1, the resistance value of the heating element R2 in FIG. 4 may be ignored. In the atomizer identifier shown in FIGS. 3 and 4, at the entry into a suction stage after identifying the information of the atomizer, that is, when an airflow signal is detected at a mouthpiece, the electronic atomization device performs an atomizing operation. In this situation, the identification voltage output port IO of the identifier chip MCU outputs a low voltage, and another control end of the identifier chip MCU outputs a corresponding PWM signal based on the identified information of the atomizer, such that the positive electrode contact H2+ is electrically connected to a power supply (not shown) via the PWM signal to control the heating element R2 through the PWM signal to generate heat for normal inhalation. During inhalation, the identification voltage output port 10 of the identifier chip MCU outputs a low voltage, the identifier chip MCU may not be burnt. Further, except that the identification voltage output port IO of the identifier chip MCU outputs a high voltage while identifying the atomizer information, the identification voltage output port 10 of the identifier chip MCU outputs a low voltage in each of the remaining stages. In this way, current consumption is further reduced to achieve an energy-saving effect.

Figure 5:
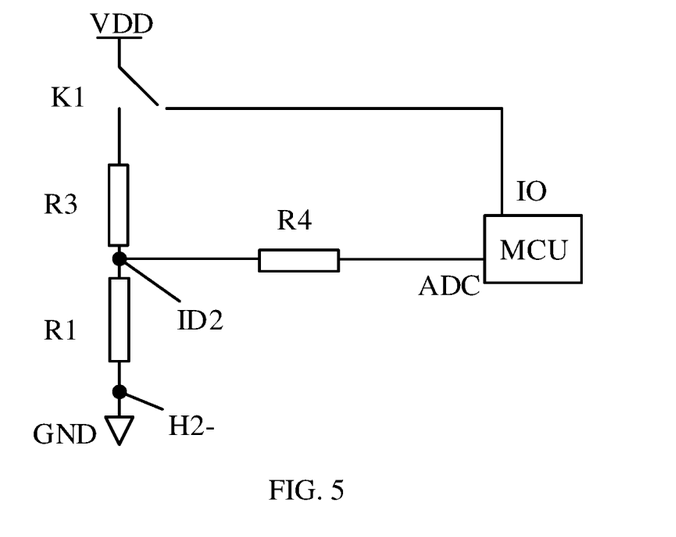
FIG. 5 is a schematic structural diagram of a fourth embodiment of an atomizer identifier applied to an electronic atomization device according to the present disclosure.

FIG. 5 is a schematic structural diagram of a fourth embodiment of an atomizer identifier applied to an electronic atomization device according to the present disclosure.

The present embodiment is a schematic structural diagram showing that the atomizer shown in FIG. 2a is connected to the atomizer identifier in the battery pole shown in FIG. 2b in the second connection manner. In detail, in the present embodiment, the identifier chip MCU includes an identification voltage control port 10 and an information acquisition port ADC. The identification voltage control port 10 is configured to output an identification voltage control signal to determine whether the identification voltage is to be output, and the information acquisition port ADC is connected to the second identification contact ID2 to acquire information of the atomizer identification circuit. As identical to the embodiments described in FIGS. 3 and 4, the atomizer identification circuit 15 in the present embodiment is an identification resistor R1.

In detail, the peripheral circuit 12 of the atomizer identifier according to the present embodiment includes an identification voltage source VDD, a primary resistor R3, a control switch K1, and a current-limiting resistor R4. The identification voltage source VDD, the control switch K1 and the primary resistor R3 are connected in series to the second identification contact ID2. In details, an end of the control switch K1 is connected to the identification voltage source VDD and the other end of the control switch K1 is connected to an end of the primary resistor R3; and an end of the primary resistor R3 is connected to the second identification contact ID2. The control switch K1 receives an identification voltage control signal from the identification voltage source VDD to determine whether to open a pathway between the identification voltage source VDD and the second identification contact ID2 based on the identification voltage control signal. The information acquisition port ADC is connected to the second identification contact ID2 via the current-limiting resistor R4. In details, an end of the current-limiting resistor R4 is connected to the information acquisition port ADC, and the other end of the current-limiting resistor R4 is connected to the second identification contact ID2.

As identical to the embodiments shown in FIGS. 3 and 4, an end of the identification resistor R1 is connected to the second identification contact ID2, and the other end thereof is connected to the ground voltage GND.

In the present embodiment, the control switch K1 is a triode, and a control end of the control switch K1 is connected to the identification voltage control port IO of the identifier chip MCU. At a stage of identifying the atomizer, the identification voltage control port IO of the identifier chip MCU controls the control switch K1 to be turned on to provide the identification voltage, and then derives the information of the atomizer based on voltage partitioning of the identification resistor R1 and the primary resistor R3. In this way, the flavor of the atomizer is identified. At the inhalation stage, the identification voltage control port IO of the identifier chip MCU controls the control switch K1 to be turned off. In this situation, the identifier chip MCU is not electrically connected to the atomizer, and therefore, the identifier chip MCU may not be burnt.

Figure 6:
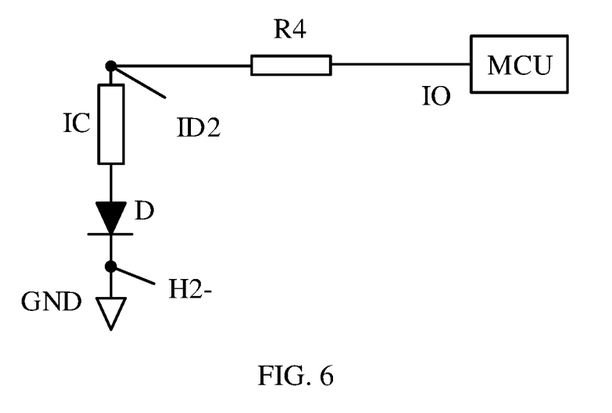
FIG. 6 is a schematic structural diagram of a fifth embodiment of an atomizer identifier applied to an electronic atomization device according to the present disclosure.

FIG. 6 is a schematic structural diagram of a fifth embodiment of an atomizer identifier applied to an electronic atomization device according to the present disclosure.

The atomizer identifier according to the present embodiment is formed by means of the atomizer shown in FIG. 2c being connected to the battery pole shown in FIG. 2b in the first connection manner. In the present embodiment, the atomizer identification circuit is an identification chip IC.

The identifier chip MCU includes an identification voltage output and information acquisition port IO. In the present embodiment, the identification voltage output and information acquisition port IO is connected to the second identification contact ID2, for outputting the identification voltage to the second identification contact ID2 and acquiring information of the atomizer in the identification chip IC from the second identification contact ID2, thereby obtaining the flavor of the atomizer.

In the present embodiment, the peripheral circuit 12 of the atomizer identifier includes a current-limiting resistor R4, and the identification voltage output and information acquisition port IO is connected to the second identification contact ID2 via the current-limiting resistor R4. In details, an end of the current-limiting resistor R4 is connected to the identification voltage output and information acquisition port IO and the other end of the current-limiting resistor R4 is connected to the second identification contact ID2. An end of the identification chip IC is connected to the second identification contact ID2 and the other end of the identification chip IC is connected to the ground voltage GND.

It may be understood that, in the present embodiment, the atomizer is connected to the atomizer identifier in the battery pole in the first connection manner. Therefore, the second identification contact ID2 is in contact with the first identification contact ID1; the negative electrode contact H2− is in contact with the second electrode contact H1−; and the positive electrode contact H2+ is in contact with the first electrode contact H1+.

The atomizer identifier according to the present embodiment further includes a diode D, and a unidirectional conduction of the identification voltage from the second identification contact ID2 to the ground voltage GND may be achieved by virtue of the diode D. In details, an anode of the diode D is connected to the identification chip IC, and a cathode of the diode D is connected to the negative electrode contact H2−.

In the present embodiment, the negative electrode contact H2− is conducted to the second electrode contact H1−. The identification voltage output and information acquisition port IO of the identifier chip MCU supply power to the identification chip IC through the second identification contact ID2, and the identification chip IC feeds back the information of the atomizer from the identification voltage output and information acquisition port IO to the identifier chip MCU, thereby obtaining the flavor of the atomizer.

Figure 7:
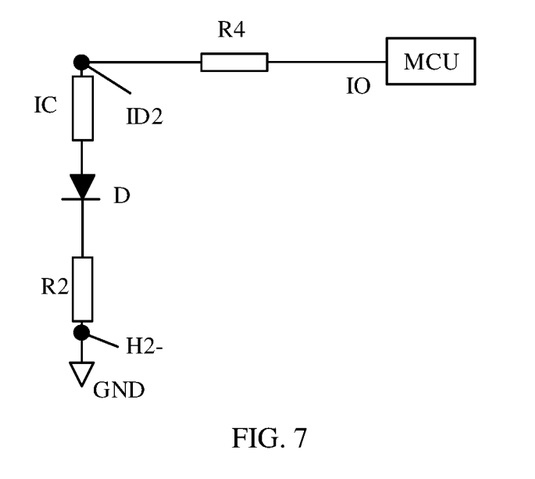
FIG. 7 is a schematic structural diagram of a sixth embodiment of an atomizer identifier applied to an electronic atomization device according to the present disclosure.

FIG. 7 is a schematic structural diagram of a sixth embodiment of an atomizer identifier applied to an electronic atomization device according to the present disclosure.

The atomizer identifier according to the present embodiment is formed by means of the atomizer shown in FIG. 2c being connected to the battery pole shown in FIG. 2b in the second connection manner. In the present embodiment, the atomizer identification circuit is an identification chip IC.

The sixth embodiment shown in FIG. 7 is different from the fifth embodiment shown in FIG. 6. The atomizer identifier according to the present embodiment further includes a heating element R2. An end of the heating element R2 is connected to an end of the identification chip IC, and the other end of the heating element R2 is connected to a ground voltage GND. Further, the present embodiment further includes a diode D. An anode of the diode D is connected to the identification chip IC, and a cathode of the diode D is connected to the heating element R2.

It may be understood that the atomizer identifier shown in the present embodiment is formed by means of the atomizer being connected to the battery pole in the second connection manner. Therefore, the negative electrode contact H2− is connected to the first electrode contact H1+; the second identification contact ID2 is connected to the first identification contact ID1; and the positive electrode contact H2+ is connected to the second electrode contact H1−.

In the present embodiment, the negative electrode contact H2− is connected to the first electrode contact H1+; and the identification chip IC is conducted to the ground voltage GND via the diode D and the heating element R2. The resistance value of the heating element R2 is relatively small, and therefore, resistance value may be ignored. After the identification voltage output and information acquisition port IO of the identifier chip supply power to the identification chip IC, it is possible to read identifiable information of the atomizer in the identification chip IC through the identification voltage output and information acquisition port IO, thereby obtaining the flavor of the atomizer.

When the atomizer identifiers shown in FIGS. 6 and 7 enter the inhalation stage after the information of the atomizer being identified, that is, when the airflow signal is detected, the electronic atomization device performs the atomizing operation. At this time, the identification voltage output and information acquisition port IO of the identifier chip MCU outputs a low voltage, and the identifier chip MCU outputs a corresponding PWM signal based on the atomizer information identified by the identification chip IC, such that the positive electrode contact H2+ is electrically connected to a power supply (not shown) via the PWM signal to control the heating element R2 through the PWM signal to generate heat for normal inhalation. During the inhalation process, the identification voltage output and information acquisition port IO of the identifier chip MCU outputs a low voltage, and the identifier chip MCU may not be burnt. Further, except that the identification voltage output and information acquisition port IO of the identifier chip MCU outputs a high voltage during the process of identifying the atomizer information, the identification voltage output port IO of the identifier chip MCU outputs a low voltage in each of the remaining stages. In this way, current consumption may be reduced to achieve the energy-saving effect. In addition, since the circuit is provided with the diode D, the identification voltage may be transmitted unidirectionally via the diode D, i.e., unidirectional transmission of the identification voltage from the second identification contact ID2 to the ground voltage GND, without damaging the identification chip IC. Further, when the atomizer is connected to the battery pole in the second connection manner, and when the positive electrode contact H2+ is electrically connected to the power supply via the PWM signal, the PWM signal may not be transmitted to the identification chip IC, given that the circuit is provided with the diode D, and therefore, the identification chip IC may not be affected.

The atomizer identifier applied to the battery pole of the electronic atomization device according to the present disclosure supplies power and reads the information of the atomizer via the identifier chip MCU and performs control via software. In this way, the information of the atomizer may be identified securely, when the atomizer and the battery pole are connected in the first connection manner or the second connection manner, and the atomizer identifier may be protected from damage at the inhalation stage.

Figure 8:
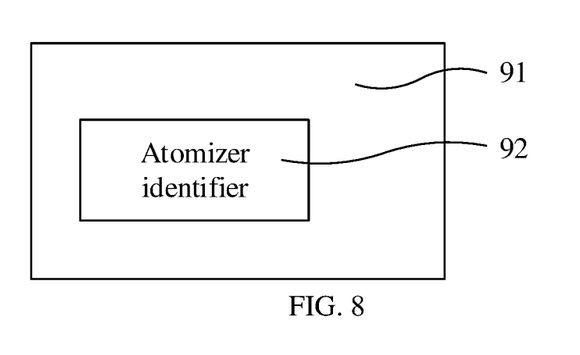
FIG. 8 is a schematic structural diagram of a battery pole of an electronic atomization device according to the present disclosure.

FIG. 8 is a schematic structural diagram of a battery pole of an electronic atomization device according to the present disclosure. In details, a battery pole 91 includes an atomizer identifier 92, which is an atomizer identifier 92 described in any of the embodiments in FIGS. 1 to 7. The atomizer identifier 92 is configured to identify the information of the atomizer connected to the battery pole, thereby obtaining the flavor of the atomizer.

The battery pole according to the present disclosure may securely identify the information of the atomizer when the atomizer is connected in either the first connection manner or the second connection manner, and may not harm the atomizer identifier 92 during the inhalation process.

The battery pole according to the present disclosure only describes a part of the structure, and the other structures are the same as those in the prior art, which will not be detailed herein.

Figure 9:
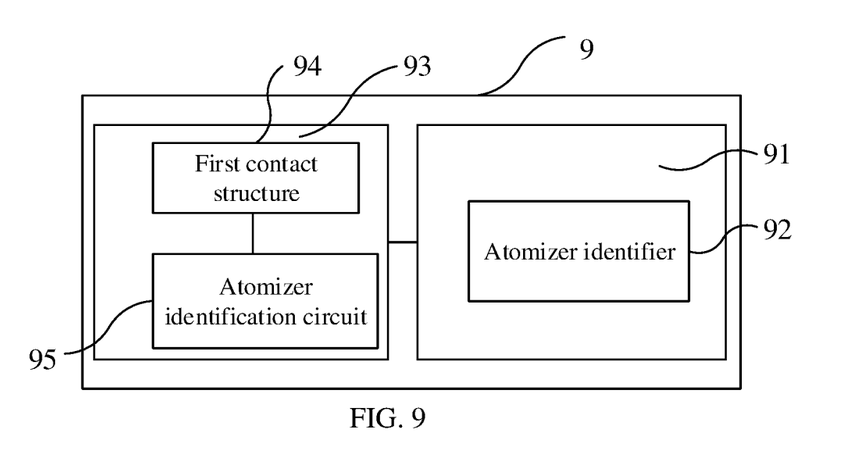
FIG. 9 is a schematic structural diagram of an electronic atomization device according to the present disclosure.

FIG. 9 is a schematic structural diagram of an electronic atomization device according to the present disclosure. The electronic atomization device 9 includes an atomizer 93 and a battery pole 91. The atomizer 93 includes a first contact structure 94 and an atomizer identification circuit 95. The battery pole 91 includes an atomizer identifier 92. The first contact structure 94 is configured to connect the atomizer identification circuit 95 and the atomizer identifier 92.

The battery pole 91 is configured to accommodate the atomizer 93. The atomizer identifier 92 is configured to identify information of the atomizer identification circuit 95, thereby determining flavor information of the atomizer. In an embodiment, the atomizer identifier 92 includes the atomizer identifier 92 described in any of the embodiments in FIGS. 1 to 7.

The foregoing are only embodiments of the present invention and do not accordingly limit the patent scope of the present invention. Any equivalent structure or equivalent process transformation made by using the contents of the description and drawings of the present disclosure, or applied directly or indirectly to other related technical fields, shall be likewise included in the scope of patent protection of the present invention.

What is claimed is:

1. An atomizer identifier, applied to an electronic atomization device for identifying an atomizer connected to a battery pole, wherein the atomizer comprises a first contact structure and an atomizer identification circuit, and the battery pole comprises a second contact structure matching the first contact structure, and the atomizer identifier comprises:
   an identifier chip, configured to determine whether an identification voltage is to be provided;
   a peripheral circuit, configured to connect the identifier chip and the second contact structure, wherein
      the peripheral circuit is connected to the atomizer identification circuit via the second contact structure and the first contact structure of the atomizer, the atomizer is connected to the battery pole in a first connection manner or in a second connection manner; and
      the atomizer identification circuit is driven based on the identification voltage determined to be provided by the identifier chip to read and input information of the atomizer identification circuit to the identifier chip.

2. The atomizer identifier according to claim 1, wherein the first contact structure of the atomizer comprises a first electrode contact, a first identification contact, and a second electrode contact; the atomizer identification circuit is connected between the first identification contact and the second electrode contact; and the second contact structure of the battery pole comprises a positive electrode contact, a second identification contact, and a negative electrode contact;
   wherein the atomizer identifier is connected to the first identification contact and the second electrode contact of the first contact structure connected in the first connection manner, or the first identification contact and the first electrode contact of the first contact structure connected in the second connection manner, via the second identification contact and the negative electrode contact of the second contact structure, to further be connected to the atomizer identification circuit to form a pathway;
   the atomizer identification circuit is driven based on the identification voltage determined to be provided by the identifier chip to read and input the information of the atomizer identification circuit to the identifier chip.

3. The atomizer identifier according to claim 2, wherein the identifier chip comprises an identification voltage output port and an information acquisition port;
   the identification voltage output port is configured to output the identification voltage, and the information acquisition port is connected to the second identification contact for acquiring the information of the atomizer identification circuit.

4. The atomizer identifier according to claim 2, wherein the identifier chip comprises: an identification voltage output and information acquisition port connected to the second identification contact to output the identification voltage and to acquire the information of the atomizer identification circuit.

5. The atomizer identifier according to claim 2, wherein the identifier chip comprises an identification voltage control port and an information acquisition port, the identification voltage control port is configured to output an identification voltage control signal to determine whether to output the identification voltage, and the information acquisition port is connected to the second identification contact to acquire the information of the atomizer identification circuit;
   the peripheral circuit comprises an identification voltage source, a primary resistor, and a control switch, wherein the identification voltage source, the control switch, and the primary resistor are connected in series to the second identification contact, and the control switch receives the identification voltage control signal to determine whether to open a pathway between the identification voltage source and the second identification contact based on the identification voltage control signal; and
   the information acquisition port is connected to the second identification contact.

6. The atomizer identifier according to claim 2, wherein the atomizer identification circuit comprises an identification resistor or an identification chip; and
   wherein the atomizer identifier is connected to the identification resistor or identification chip in the atomizer identification circuit via the second identification contact and further via the first identification contact of the atomizer connected in the first connection manner or the second connection manner; and
   the atomizer identifier is connected to the negative electrode contact of the battery pole via the second electrode contact of the atomizer connected in the first connection manner to receive a ground voltage; or
   the atomizer identifier is connected to the negative electrode contact of the battery pole via a heating element and the first electrode contact of the atomizer connected in the second connection manner to receive the ground voltage.

7. The atomizer identifier according to claim 6, wherein the atomizer identification circuit further comprises a diode connected between the identification chip and the second electrode contact; and
   the atomizer identifier realizes unidirectional conduction from the provided identification voltage to the ground voltage via the diode.

8. A battery pole of an electronic atomization device, comprising an atomizer identifier, wherein the atomizer identifier is configured to identify an atomizer connected to the battery pole, the atomizer comprises a first contact structure and an atomizer identification circuit, the battery pole further comprises a second contact structure matching the first contact structure, and the atomizer identifier comprises:
   an identifier chip, configured to determine whether an identification voltage is to be provided;
   a peripheral circuit, configured to connect the identifier chip and the second contact structure, wherein
      the peripheral circuit is connected to the atomizer identification circuit via the second contact structure and the first contact structure of the atomizer, the atomizer is connected to the battery pole in a first connection manner or in a second connection manner; and
      the atomizer identification circuit is driven based on the identification voltage determined to be provided by the identifier chip to read and input information of the atomizer identification circuit to the identifier chip.

9. The battery pole according to claim 8, wherein the first contact structure of the atomizer comprises a first electrode contact, a first identification contact, and a second electrode contact; the atomizer identification circuit is connected between the first identification contact and the second electrode contact; and the second contact structure of the battery pole comprises a positive electrode contact, a second identification contact, and a negative electrode contact;
  wherein the atomizer identifier is connected to the first identification contact and the second electrode contact of the first contact structure connected in the first connection manner, or the first identification contact and the first electrode contact of the first contact structure connected in the second connection manner, via the second identification contact and the negative electrode contact of the second contact structure, to further be connected to the atomizer identification circuit to form a pathway;
  the atomizer identification circuit is driven based on the identification voltage determined to be provided by the identifier chip, so as to read and input the information of the atomizer identification circuit to the identifier chip.

10. The battery pole according to claim 9, wherein the identifier chip comprises an identification voltage output port and an information acquisition port;
  the identification voltage output port is configured to output the identification voltage, and the information acquisition port is connected to the second identification contact for acquiring the information of the atomizer identification circuit.

11. The battery pole according to claim 9, wherein the identifier chip comprises: an identification voltage output and information acquisition port connected to the second identification contact to output the identification voltage and to acquire the information of the atomizer identification circuit.

12. The battery pole according to claim 9, wherein the identifier chip comprises an identification voltage control port and an information acquisition port, the identification voltage control port is configured to output an identification voltage control signal to determine whether to output the identification voltage, and the information acquisition port is connected to the second identification contact to acquire the information of the atomizer identification circuit;
  the peripheral circuit comprises an identification voltage source, a primary resistor, and a control switch, wherein the identification voltage source, the control switch, and the primary resistor are connected in series to the second identification contact, and the control switch receives the identification voltage control signal to determine whether to open a pathway between the identification voltage source and the second identification contact based on the identification voltage control signal; and
  the information acquisition port is connected to the second identification contact.

13. The battery pole according to claim 9, wherein the atomizer identification circuit comprises an identification resistor or an identification chip; and
  wherein the atomizer identifier is connected to the identification resistor or identification chip in the atomizer identification circuit via the second identification contact and further via the first identification contact of the atomizer connected in the first connection manner or the second connection manner; and
  the atomizer identifier is connected to the negative electrode contact of the battery pole via the second electrode contact of the atomizer connected in the first connection manner to receive a ground voltage; or
  the atomizer identifier is connected to the negative electrode contact of the battery pole via a heating element and the first electrode contact of the atomizer connected in the second connection manner to receive the ground voltage.

14. The battery pole according to claim 13, wherein the atomizer identification circuit further comprises a diode connected between the identification chip and the second electrode contact; and
  the atomizer identifier realizes unidirectional conduction from the provided identification voltage to the ground voltage via the diode.

15. An electronic atomization device, comprising:
  an atomizer, comprising a first contact structure and an atomizer identification circuit, and
  a battery pole, comprising an atomizer identifier and a second contact structure matching the first contact structure, wherein the atomizer is arranged inside the battery pole and connected to the battery pole;
  wherein the atomizer identifier comprises:
  an identifier chip, configured to determine whether an identification voltage is to be provided;
  a peripheral circuit, configured to connect the identifier chip and the second contact structure, wherein
    the peripheral circuit is connected to the atomizer identification circuit via the second contact structure and the first contact structure of the atomizer, the atomizer is connected to the battery pole in a first connection manner or in a second connection manner; and
    the atomizer identification circuit is driven based on the identification voltage determined to be provided by the identifier chip to read and input information of the atomizer identification circuit to the identifier chip.

16. The electronic atomization device according to claim 15, wherein the first contact structure of the atomizer comprises a first electrode contact, a first identification contact, and a second electrode contact; the atomizer identification circuit is connected between the first identification contact and the second electrode contact; and the second contact structure of the battery pole comprises a positive electrode contact, a second identification contact, and a negative electrode contact;
  wherein the atomizer identifier is connected to the first identification contact and the second electrode contact of the first contact structure connected in the first connection manner, or the first identification contact and the first electrode contact of the first contact structure connected in the second connection manner, via the second identification contact and the negative electrode contact of the second contact structure, to further be connected to the atomizer identification circuit to form a pathway;
  the atomizer identification circuit is driven based on the identification voltage determined to be provided by the identifier chip, so as to read and input the information of the atomizer identification circuit to the identifier chip.

17. The electronic atomization device according to claim 16, wherein the identifier chip comprises an identification voltage output port and an information acquisition port;
  the identification voltage output port is configured to output the identification voltage, and the information acquisition port is connected to the second identification contact for acquiring the information of the atomizer identification circuit.

18. The electronic atomization device according to claim 16, wherein the identifier chip comprises: an identification voltage output and information acquisition port connected to the second identification contact to output the identification voltage and to acquire the information of the atomizer identification circuit.

19. The electronic atomization device according to claim 16, wherein the identifier chip comprises an identification voltage control port and an information acquisition port, the identification voltage control port is configured to output an identification voltage control signal to determine whether to output the identification voltage, and the information acquisition port is connected to the second identification contact to acquire the information of the atomizer identification circuit;

the peripheral circuit comprises an identification voltage source, a primary resistor, and a control switch, wherein the identification voltage source, the control switch, and the primary resistor are connected in series to the second identification contact, and the control switch receives the identification voltage control signal to determine whether to open a pathway between the identification voltage source and the second identification contact based on the identification voltage control signal; and the information acquisition port is connected to the second identification contact.

20. The electronic atomization device according to claim 16, wherein the atomizer identification circuit comprises an identification resistor or an identification chip; and wherein the atomizer identifier is connected to the identification resistor or identification chip in the atomizer identification circuit via the second identification contact and further via the first identification contact of the atomizer connected in the first connection manner or the second connection manner; and the atomizer identifier is connected to the negative electrode contact of the battery pole via the second electrode contact of the atomizer connected in the first connection manner to receive a ground voltage; or the atomizer identifier is connected to the negative electrode contact of the battery pole via a heating element and the first electrode contact of the atomizer connected in the second connection manner to receive the ground voltage.

* * * * *